US008051426B2

(12) United States Patent
Meijer et al.

(10) Patent No.: US 8,051,426 B2
(45) Date of Patent: Nov. 1, 2011

(54) CO-ROUTINES NATIVE TO A VIRTUAL EXECUTION ENVIRONMENT

(75) Inventors: Henricus Johannes Maria Meijer, Mercer Island, WA (US); Brian C. Beckman, Newcastle, WA (US); Mark B. Shields, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1328 days.

(21) Appl. No.: 11/619,973

(22) Filed: Jan. 4, 2007

(65) Prior Publication Data

US 2008/0168438 A1 Jul. 10, 2008

(51) Int. Cl.
*G06F 9/46* (2006.01)
*G06F 9/455* (2006.01)

(52) U.S. Cl. ............................................ 718/108; 718/1
(58) Field of Classification Search ............... 718/1, 108
See application file for complete search history.

(56) References Cited

U.S. PATENT DOCUMENTS

| 5,485,616 | A | 1/1996 | Burke |
| 5,970,242 | A | 10/1999 | O'Connor |
| 6,112,253 | A | 8/2000 | Gerard |
| 6,141,723 | A | 10/2000 | Lyons |
| 6,539,339 | B1 | 3/2003 | Berry |
| 6,715,148 | B1 | 3/2004 | Endicott |
| 6,738,965 | B1 | 5/2004 | Webster |
| 6,976,254 | B2 | 12/2005 | Kramskoy |
| 7,058,954 | B1 | 6/2006 | Wollrath |
| 2003/0088604 | A1* | 5/2003 | Kuck et al. .................. 709/1 |
| 2005/0081016 | A1 | 4/2005 | Sakai |

OTHER PUBLICATIONS

Achauer, Bruno. "The TNT Virtual Machine", Computer Science Department, Telecooperation Group, University of Linz, Aug. 11, 2005.*
Deretta, Giovanni. "Coroutines", boost C++ Libraries, 2006.*
"setcontext(2)", man pages section 2: System Calls, Oracle, Feb. 5, 2001.*
Giancarlo Niccolai. The Falcon programming language—Survival Guide. 2006. http://www.falconpl.org/downloads/survival-1.0-prebeta-2.pdf. Last accessed Sep. 26, 2006.
Jacob Matthews, et al. Automatically Restructuring Programs for the Web. 2004 Kluwer Academic Publishers. Printed in the Netherlands. http://www.cs.brown.edu/people/sk/Publications/Papers/Published/mfgkf-web-restructuring-cps-journal/paper.pdf. Last accessed Sep. 26, 2006.
Christian Tismer. Continuations and Stackless Python or "How to change a Paradigm of an existing Program". http://www.tismer.com/research/stackless/spcpaper.doc. Last accessed Sep. 26, 2006.

* cited by examiner

*Primary Examiner* — Meng An
*Assistant Examiner* — Brian Chew (57) ABSTRACT

A virtual machine is extended to include native support for co-routines. In this manner, high-level programmers are afforded access to such functionality. More particularly, supplied is a mechanism inside the virtual machine to enable method/function state to be maintained and subsequently restored. Consequently, a method/function can be called multiple times and resume where it last left off. This provides direct support for tier splitting patterns, iterators and comprehensions, among other things.

20 Claims, 11 Drawing Sheets

CO-ROUTINES NATIVE TO A VIRTUAL EXECUTION ENVIRONMENT

BACKGROUND

Computer programs are lists of instructions that describe actions to be performed by a computer or processor-based device. When a computer program is loaded and executed on computer hardware, the computer will behave in a predetermined manner by following the instructions of the computer program. Accordingly, the computer becomes a specialized machine that performs the tasks prescribed by the instructions. A programmer using a programming language creates the instructions comprising a computer program. As computer programs became more sophisticated, programming languages have evolved from low-level machine code languages, easily understood by computers, to high-level source code languages more readily comprehensible to humans. Such programs include a plurality of constructs including subroutines.

A subroutine (e.g., function, method, procedure . . . ) is a portion of relatively independent code within a larger program designed to perform a particular task. Subroutines are beneficial at least because they modularize or break code up into logical segments. This affords many advantages such as reducing program redundancy, enabling reuse across programs, decomposing complex problems into smaller pieces and improving readability, among other things. Subroutines themselves are composed of a body of code for execution, parameters that are passed when called and a return result. While subroutines are common programming constructs, a generalization thereof, namely co-routines are not.

In contrast to subroutines, co-routines are program components that allow multiple entry points as well as suspending and resuming execution at particular code locations. The start of subroutine is the only entry point, while the start of a co-routine is only one entry point. Subsequent points can follow returns. Further, a subroutine only returns once, while co-routines can return multiple times. Further yet, co-routine lifespan is defined by utilization and subroutine lifespan is completed after a sequential execution.

While co-routines are more generic, they are also less widely employed due at least in part to implementation problems/complexities. Most implementations are confined to low-level assembly language implementations. In high-level languages programmers are responsible for maintaining state and execution paths via global state variables, flags and the like. Among other things, this is difficult to comprehend and maintain and can also be computationally expensive as it adds an additional layer of interpretation.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to co-routines and execution thereof within a virtual environment. More particularly, an application virtual machine is provided that directly or natively supports asymmetric co-routines including arbitrarily nested and/or recursive co-routines. The virtual machine includes efficient mechanisms that enable capture and restoration of co-routine state or context as well as mechanisms to facilitate provisioning of co-routine results and transfer of control. Programmers can thus write high-level simplified code that utilizes co-routines without implementation overhead. Furthermore, as a consequence of native support for co-routines, native support is also provided for many other control and/or data structures including iterators and comprehensions, amongst others.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided relating to provisioning of support for co-routines natively in a virtual machine. The native support can facilitate execution of high-level programming languages including at least one co-routine across multiple computer platforms. More particularly, the virtual machine can maintain complete co-routine state to enable a co-routine to be called multiple times and resume where it previously left off. Further yet, the virtual machine can be designed to support arbitrary nested and/or recursive calls of subroutines and/or co-routines.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
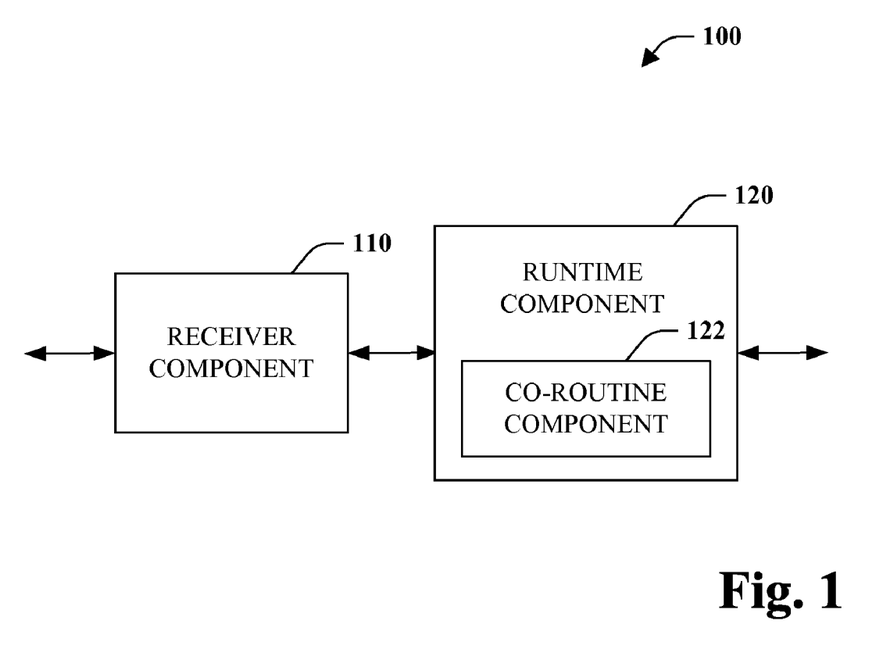
FIG. 1 is a block diagram of an application virtual machine system.

Referring initially to FIG. 1, an application virtual machine 100 is depicted in accordance with an aspect of this disclosure. As will be described further infra, the virtual machine 100 facilitates computer platform independent specification and/or execution of programs that include one or more co-routines. The virtual machine 100 includes a receiver component 110 and a runtime component 120.

The receiver component 110 receives, retrieves or otherwise obtains or acquires a computer program or representation thereof including at least one co-routine. In one instance, such a computer program can correspond to an intermediate language or bytecode version of a high-level programming language code directed toward the virtual machine. The receiver component 110 can provide or make such a program accessible to the runtime component 120.

The runtime component 120 executes a received or retrieved program or version thereof. Execution can comprise emulating program execution on a particular computer platform. In other words, a program directed toward a virtual machine architecture can be executed on specific computing hardware.

The runtime component 120 also includes a co-routine component 122 to support natively direct or native execution of programs including one or more co-routines. As previously described, co-routines are a generalization of subroutines in that they allow multiple entry points and can be suspended and resumed at particular code locations. The co-routine component 122 provides programmatic instructions and/or constructs that facilitate execution of one or more co-routines including nested sub-routines, co-routines or a combination thereof. As a result, native support is provided for tier splitting patterns, iterators and comprehensions, among other things.

By way of example and not limitation, consider an instance in which there is a collection of items over which some operations are desired to be performed. In psuedocode:

```
Dim L = GetList(...);
for each e in L
    Examine(e);
```

The problem with this is that the entire list needs to be acquired and pulled in to the procedure. This is fine if there is only a few items in the collection, but if there are a billion items this is not a viable option. Accordingly, programmers will typically write something like:

```
Dim L = GetCursor(List) //lightweight
while (L.MoveNext( ))
    examine (L.Current( ));
```

Here, Cursor exposes a pair of functions namely MoveNext and Current. MoveNext returns true as long as there is something in the list and otherwise returns false. Current returns the current value under the cursor. A standard implementation of GetCursor is:

```
Class Cursor
{
    int cp = -1       //cp--> current position
    MoveNext( )
    {
        cp ++
        if cp > length
            return false
        else
            return true
    }
    Current
    {
        Return L [cp]
    }
}
```

Interesting to note is that this sub-routine needs a global instance variable containing the state or memory of the position of the cursor (cp). In a normal sub-routine that does not read or modify global state, subsequent calls to the sub-routine do not recall anything about previous calls. Given the same arguments, a stateless sub-routine will return the same result. It does a computation, returns a result and forgets everything without a variable containing state. However, use of a global variable is not desirable as such code becomes increasingly complicated and computationally expensive with more sophisticated constructs (e.g., trees, graphs . . . ) and control structures (e.g., nesting). What is more desirable is a routine that can maintain state across multiple calls or in other words a co-routine. For example:

```
MoveNext
{
    for (i = 0, i<length; i++)
        yield true
    yield false
}
Current
{
    return data[i];    //this is an ordinary return.
}
```

Here, there is a for-loop that iterates over a collection like an ordinary list and returns multiple times. The code in MoveNext is operating under a fiction that it does not return. An ordinary function when it returns is completely forgetful. This MoveNext is different in that the word "yield" is substituted for "return." Return means send control back to my caller and forget everything. Yield means send control back to my caller and remember everything. Thus, instead of picking up at the beginning, subsequent calls pick up after the yield.

Moreover, it should be appreciated that a programmer could get rid of MoveNext altogether. Instead of simulating this old design, a better design can be employed with the help of co-routines such as:

```
Class List
{   Data [...]
    GetNext( )
    {
        For i = 0; i < length; i++
            yield Data[i]
    }
}
```

Accordingly, in phase one, a complex implementation of a standard pattern-move next was replaced with a standard interface MoveNext and Current. Thus, a flawed implementation was replaced with a better implementation. In phase two, an interface was replaced with a better interface. Now the code is really simple.

The virtual machine 100 and components thereof are operable to handle implementation details automatically behind the scenes to enable users to specify such simplified code in high-level languages. Further yet, the manner of implementation enables arbitrary recursive calls of a combination of one or more co-routines and subroutines. As will be described further infra, the decision of whether to capture state can be done by local control (e.g., yield, return). Such local decisions in code permit recursive behavior that can be employed to do arbitrarily complex patterns.

Figure 2:
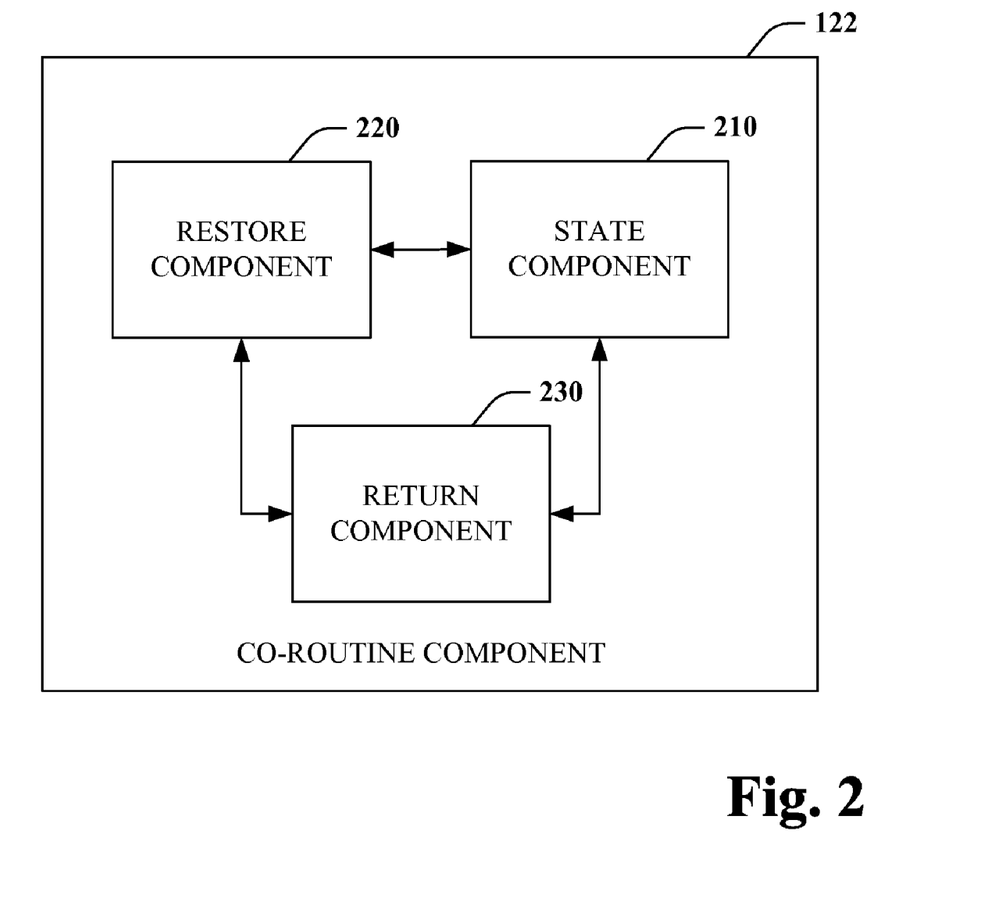
FIG. 2 is a block diagram of a representative co-routine component.

Referring attention to FIG. 2, a co-routine component 122 is illustrated in further detail. The co-routine component 122 supplies native support for execution of co-routines in a virtual machine 110. The component 122 includes a state component 210 that captures co-routine state including but not limited to variable and/or parameter values. For example, an entire stack frame associated with a co-routine can be saved.

The co-routine component 122 also includes a restore component 220 that provides a mechanism to restore captured co-routine state upon subsequent call. For instance, the restore component 220 can locate a captured stack frame and save the frame to a stack. Alternatively, the restore component 220 can simply direct an instruction pointer or stack pointer to another stack including the captured frame to allow execution from that stack.

Return component 230 is a mechanism to facilitate returning results to a co-routine caller. As mentioned, co-routines can return results similar to regular subroutines. Such results, however, can vary as a function of co-routine state. The return component 230 provides results to a caller for example after a yield statement.

The return component 230 can also inherently handle passing control from a co-routine to a caller alone or in combination with results. In one embodiment, this can be implemented with together with exception handling. For example, a callee can explicitly throw an exception at the caller, where it will be thrown at a current resumption point. If the callee throws an exception, it will bubble up to the caller alone or in conjunction with results.

Various implementations can be utilized to afford functionality associated with the co-routine component 122. The implementations can vary as a function a particular programming language or type thereof and/or details of virtual machine architecture. Provided below are several exemplary implementations associated with object-oriented programming languages and stack-based virtual machines.

In the context of an object-oriented programming language, methods are associated with class instance (e.g., instance or virtual methods) or with a global class object (e.g., static methods). The class instance is passed as an implicit argument to a method call usually written using "." (dot) notation in a source language. For instance:
Dim B As New Button( )
Dim C=B.BackColor( )
Therefore, one choice for co-routines is to maintain a frame of the co-routine as part of the instance state of an object on which the co-routine is defined.

Another implementation can be to define a new class of objects, like delegates, that have a single method to capture and maintain a frame, among other things, as their state. This design allows a similar pattern as the BeginInvoke/EndInvoke design pattern for delegates. For instance:

```
Class X
    Function F(I As Integer) As Integer
    On Return Resume Next
        Return I
        Return H(I)    \\REM H should deliver values to caller of F
        Return I
    End Function
    Function H(I As Integer) As Integer
    On Return Resume Next
        Return I
        Return I
    End Function
End Class
Now Resume can be strongly typed with the signature of the "frame"
```

-continued

```
Dim R As New Coroutine(X.F)    \\REM creates a new frame for the
                                 call X.F and
                                 \\suspends
Dim A = R.Resume(0)            \\REM 0
Dim B = R.Resume(1)            \\REM 1
Dim C = R.Resume(2)            \\REM 2
Dim D = R.Resume(3)            \\REM 3
```

Yet another implementation can be to create the stack frame for F when creating X and then on resuming F pass it the next parameter at each subsequent "call." If F itself never invokes another co-routine, it will deliver its value directly to the caller of F. For instance:

```
Class X
    Function F(I As Integer) As Integer
    On Return Resume Next
        Return I
        Return I
        Return I
        Return I
    End Function
End Class
Dim X As New X( )
Dim A = X.F(0)
Dim B = X.F(1)
Dim C = X.F(2)
Dim D = X.F(3)
```

Turning to FIGS. 3a-e, several graphical illustrations are provided to facilitate clarity and understanding with respect to how the virtual machine 100 can process co-routines. These illustrations are solely exemplary and not meant to limit the scope of the claimed subject matter. The illustrations take the form of two sequential routines with various execution nodes that begin at the first node and complete at the last node. The routines on the left identify a caller (e.g., subroutine, co-routine . . . ) and the routine on the right represent a callee co-routine. Also provided are stack frames associated with both the caller and the callee (The stack grows down in this example). Such an example can correspond to lightweight cooperative multitasking between interleaved threads or a client-server interaction, among other things. For instance, the caller can correspond to a client shopping application that interacts with a virtual shopping cart to add and/or remove items from the cart.

Figure 3A:
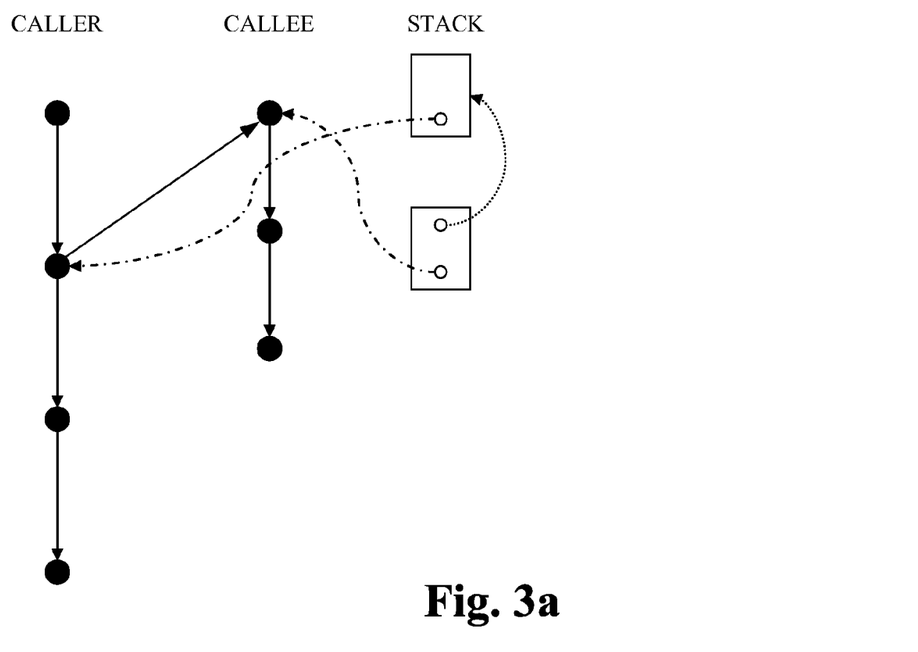
FIGS. 3a-e provide illustrations of exemplary execution stages of a co-routine.

Referring first to FIG. 3a the illustration depicts an initial execution of a routine that calls a co-routine. The stack begins with solely the frame associated with the caller. Subsequently, at the second node, the caller initiates a method call to the callee. Consequently, a new frame (a.k.a. stack frame, activation frame, activation record . . . ) is added to the stack that points to the first instruction in the callee and includes a dynamic link to the frame of the caller.

Figure 3B:
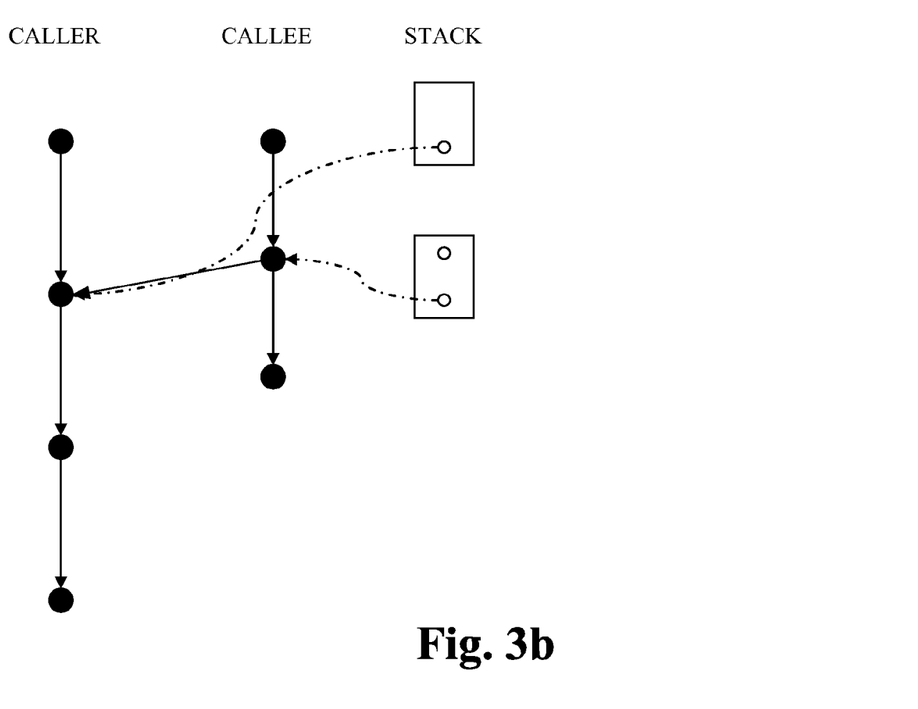
Figure 3C:
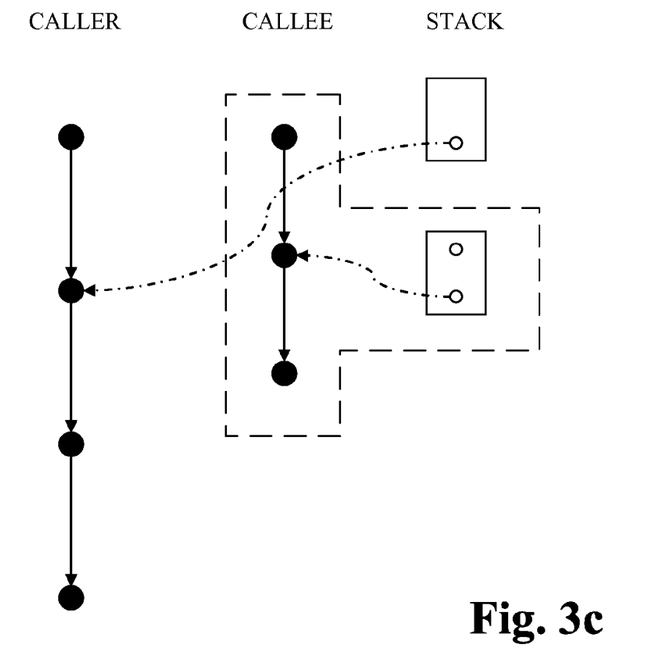

FIG. 3b provides an illustration of the state of the routines following execution of the first co-routine instruction. Here, a yield of the like occurs at the second node of the callee. Control and potentially return result(s) are provided back to the caller via the previously provided frame link and the frame is saved. For example, the frame can be saved to a designated location and/or object (e.g. table) for co-routine frames.

To call an ordinary subroutine, it is enough to know the code to be executed, since a new frame will be allocated and deallocated for each call. However, to resume a co-routine, there should be a handle to its frame in order to resume from the point were it previously left off. A resumable co-routine is represented by the dashed area in FIG. 3c. Note that when exposed as a first class citizen as supported by the subject innovation such a co-routine need not be resumed by the same caller.

Figure 3D:
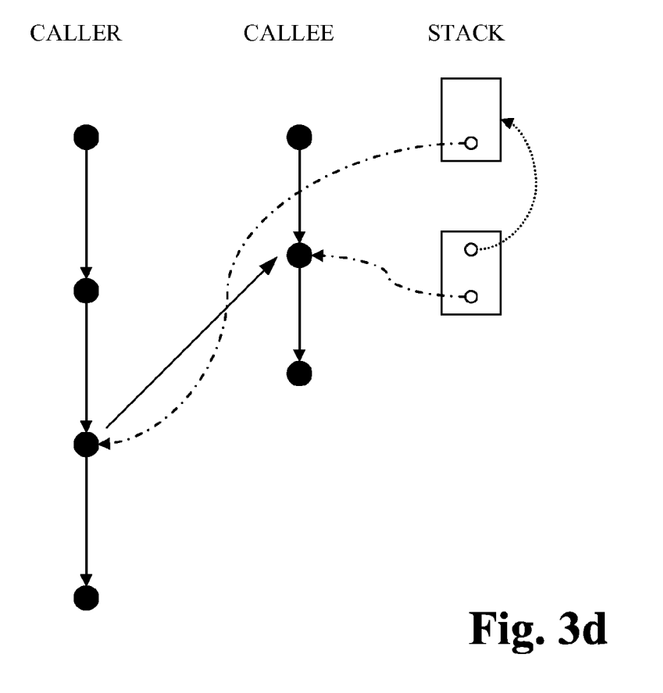

FIG. 3d provides an illustration of the caller resuming execution of the callee after some period of time (e.g., seconds, minutes, hours, days, weeks . . . ). The caller resumes execution at the second step in the caller routine. Again, a link is provided back to the caller in the callee frame to facilitate provisioning of control and/or results.

Figure 3E:
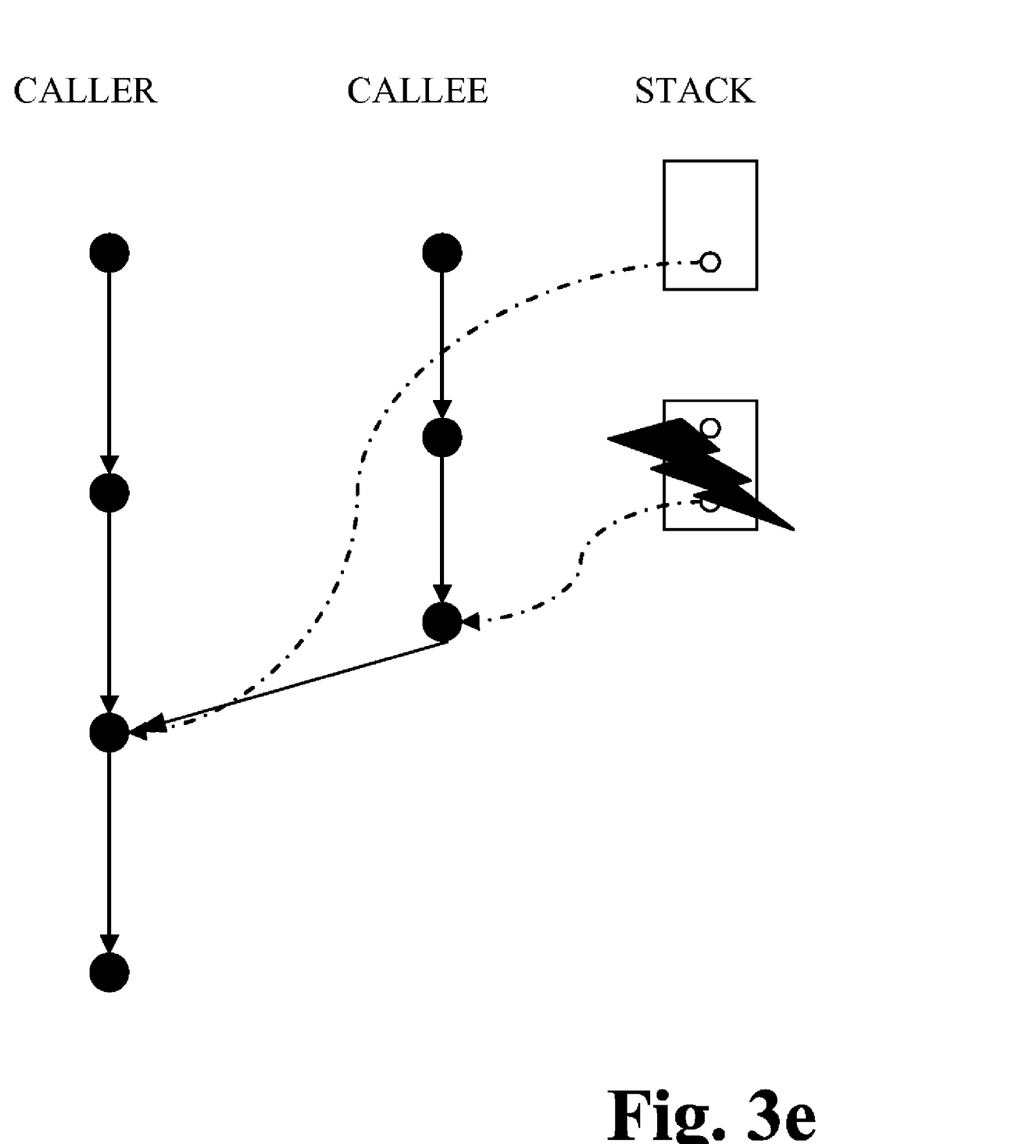

Subsequently, the callee terminates as illustrated in FIG. 3e. Here, control and/or results are provided back to the caller via the previous frame link. The callee frame can then be removed or made eligible for removal by a garbage collection component or the like. The caller can then proceed until termination upon which its frame can be removed from the stack or otherwise made eligible for removal (not shown).

Figure 4:
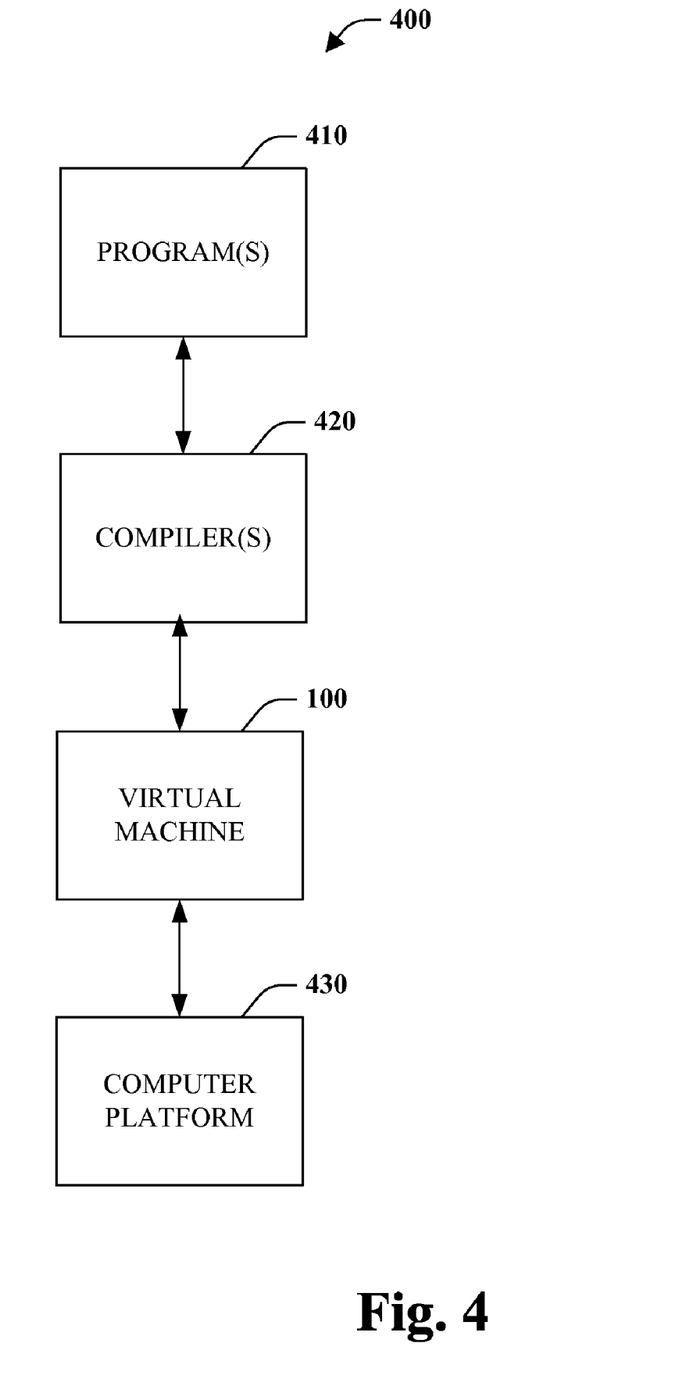
FIG. 4 is a block diagram of a virtual application execution environment.

Turning attention to FIG. 4, a virtual application execution environment 400 is illustrated in accordance with this disclosure. The execution environment 400 can be modified to provide native or direct support for execution of co-routines. Applications or programs 410 can includes one or more co-routines nested or otherwise. Furthermore, such programs can be specified in a simplified format for example utilizing a "yield" or "coreturn" command to indicate that control should be transferred to a caller and a co-routine suspended.

The program(s) 410 can be compiled via an associated compiler component 420. More specifically, a program 410 can be compiled into an intermediate language or form directed toward an instruction set architecture supported by the virtual machine 100. In accordance with an aspect of the innovation, the virtual machine instruction set can provide specific commands associated with execution of co-routines as it is natively supported. For example, a "yield" may map to a "coretum" call during compilation and/or calling routines may have their co-routine tagged with a "cocall."

The virtual machine 100 as previously described is operable to receive the compiled code and from the compiler 420 and execute such code. The virtual machine 100 isolates programs 410 from the hardware platform used to physically execute the program 410. Versions of the virtual machine 100 can target particular computing platforms 430 (e.g., Macintosh, IBM, Linux . . . ) such that applications need not be written for multiple platforms but rather for the virtual machine 100. The virtual machine 100 can subsequently interpret or compile the intermediate language code, for instance utilizing a just-in-time compiler, to facilitate execution on a particular computing platform 430. Among other things, the virtual machine 100 can handle memory management, thread management, garbage collection and security with respect to program execution. In accordance with an aspect of the innovation, the virtual machine 100 can also natively support execution of co-routines. In particular, it can provide mechanisms to capture co-routine state, resume suspended execution based on a previous state or context and facilitate provisioning of results to callers. This can be handled at a local level rather than a global level to enable nesting and/or recursion with respect to co-routines.

It should be noted that while programmers could manually implement co-routines in a high-level language, for example by explicitly maintaining and restoring a state of a co-routine including its continuation point. However, this would require rewriting a program in some form of continuation passing style thereby introducing an additional layer of interpretation. Further, compilers could potentially perform this task behind the scenes, but the resulting target program would still be inefficient since this does not remove the need for an extra layer of interpretation. By contrast, this need is removed and programs can be executed efficiently with direct support for asymmetric co-routines.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the compiler 420 and/or virtual machine 100 could utilize such mechanisms to infer that a routine would be more efficiently written as a co-routine and perform such transformation.

Figure 5:
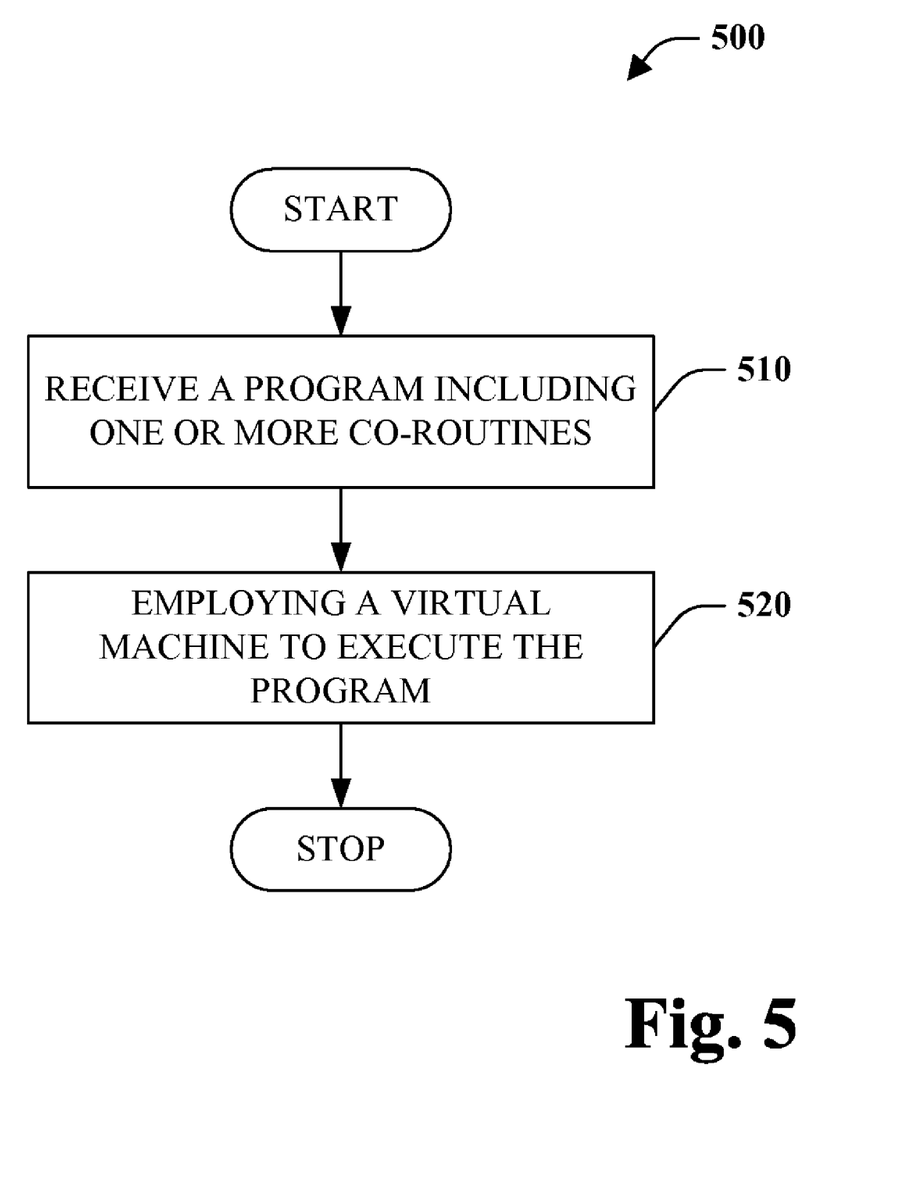
FIG. 5 is a flow chart diagram of a method of program execution.
Figure 6:
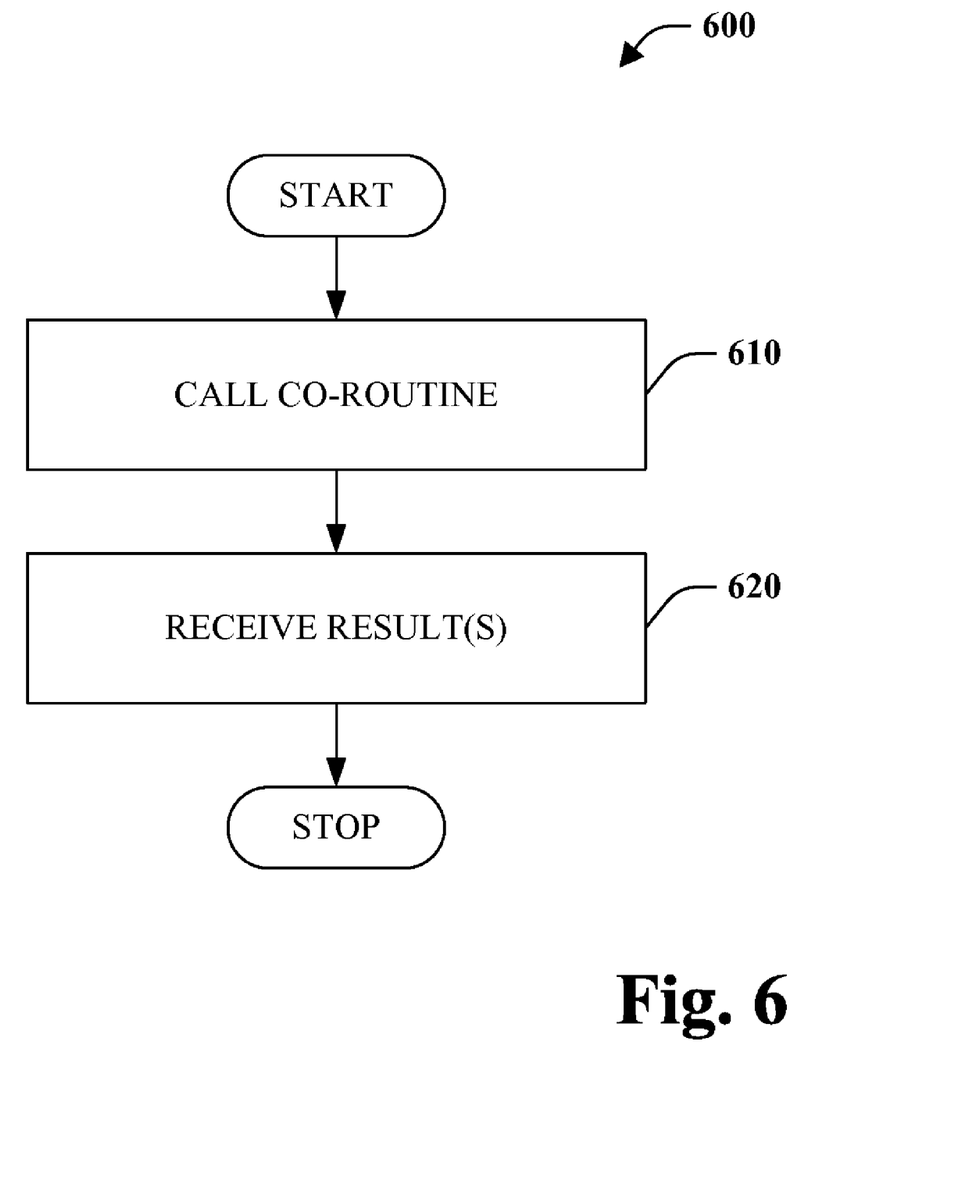
FIG. 6 is a flow chart diagram of a method of interacting with a co-routine.
Figure 7:
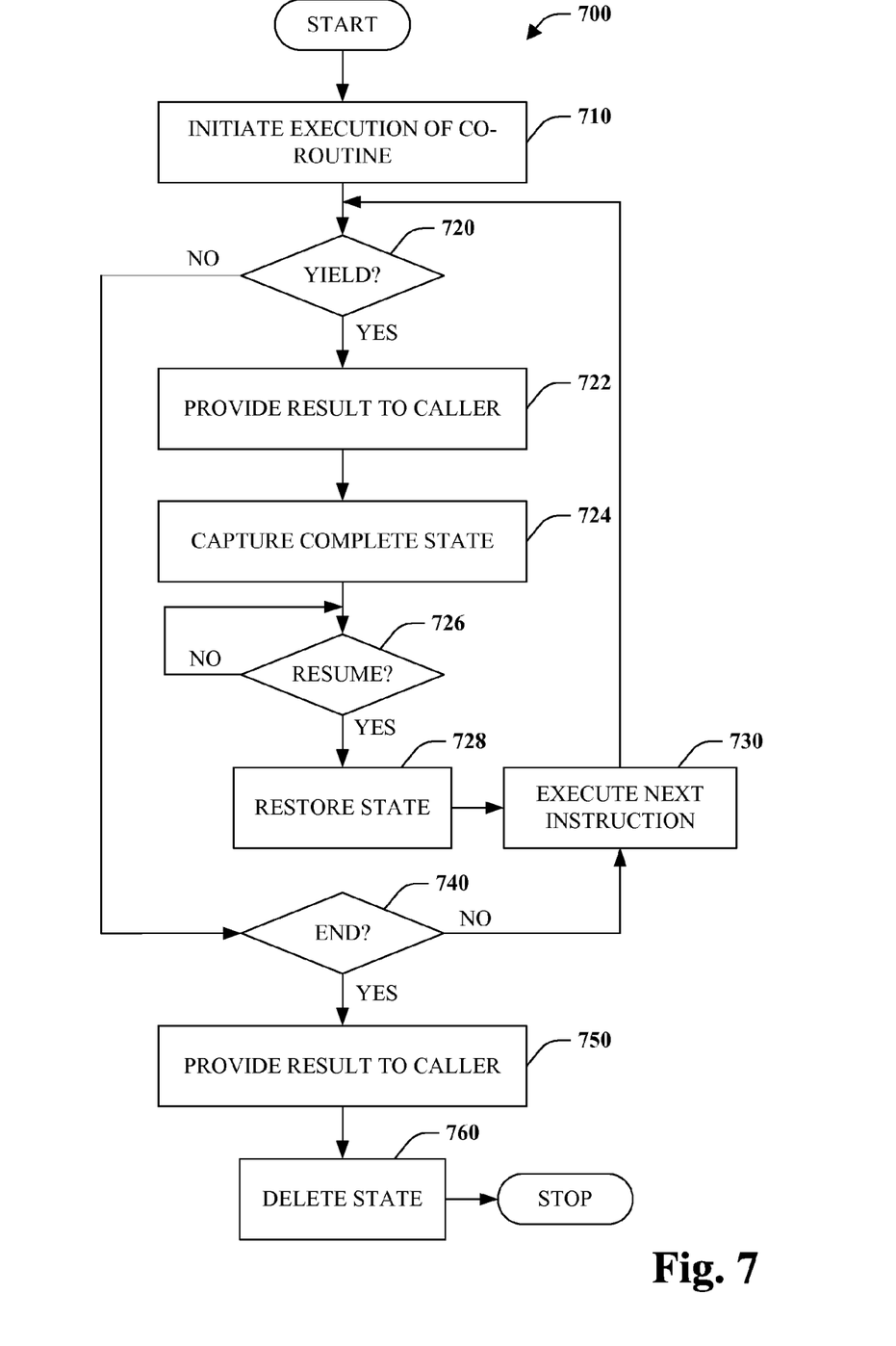
FIG. 7 is a flow chart diagram of a method of processing a co-routine.

In view of the exemplary systems described supra, methodologies that may be implemented in accordance with the disclosed subject matter will be better appreciated with reference to the flow charts of FIGS. 5-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 5, a method of program execution 500 is depicted in accordance with an aspect of this disclosure. At reference numeral 510, a program is received including one or more co-routines. The program can correspond to a high-level programming language such as an object-oriented programming language that includes a simplified manner of employing co-routines. Stated differently, the language does not include a manual or explicit implementation of co-routines but rather is specified more concisely for example by replacing a conventional "return" command with a "yield" command. In this manner, desired action is identified but not specifically implemented by the program. Further yet, it should be appreciated that the program can include arbitrarily nested and/or recursive co-routines alone or in conjunction with other programmatic constructs such as standard natively supported subroutines. For example, such co-routines can be utilized to implement tier splitting patterns, iterators and/or comprehensions among other things.

At reference numeral 520, a virtual machine is employed to execute the program. The virtual machine can correspond to any conventional application virtual machine (e.g., Java virtual machine, Common Language Runtime (CLR) . . . ) modified to directly support co-routines. For instance, the program or a compiled version thereof can be specified for execution by the virtual machine. Accordingly, the virtual machine provides native mechanisms to support capture and restore of co-routine state as well as passing of values and transfer of control between co-routines and other co-routines and/or conventional sub-routines, inter alia. The virtual machine is then operable to execute the program on a particular hardware platform via interpretation or compilation, for example.

FIG. 6 is a flow chart diagram of a method 600 of employing a co-routine in accordance with an aspect of the disclosure. At reference numeral 610, a co-routine is called with one or more parameters where appropriate. Optionally, a label may be associated with the call such as "cocall" to identify that fact that the object is a co-routine. This can be useful in type checking, among other things. For example:

```
Main( )
{ Dim x = cocall f(2);
    C.WL (x);
}
```

Here, the function f( ) is a co-routine labeled with a "cocall" tag and provided with the parameter "2." At numeral 620, the caller or calling object receives a result of the co-routine execution. Unlike a conventional subroutine, it should be noted that given the same parameter the returned result might be different given the state of the co-routine at the time it is called. Such co-routines can be utilized to generate simplified code for iterators and comprehensions among other things.

FIG. 7 illustrates a method 700 of processing a co-routine according to an aspect of this description. At reference numeral 710, execution of a co-routine is initiated with the first instruction. At 720, a determination is made as to whether the instruction is a yield or like instruction (e.g., coreturn). If yes, the method 700 proceeds to numeral 722, where the result is returned to a caller. At reference numeral 724, the state of the co-routine is captured and saved. As previously discussed, this can be accomplished utilizing a variety of manners including without limitation capturing the state as part of an instance state on which the co-routine is defined or defining a delegate or like object that maintains a frame as its state. In any event, the state or context of the co-routine including all local and free variables, among other things can be saved. The co-routine can then be said to be in a suspended state. At reference numeral 726, a determination is made as to whether the co-routine as been resumed meaning it has been called again. If no, the method 700 can loop back to 726 or otherwise wait until it is called. If yes, the method 700 continues at numeral 728 where co-routine state is restored. In one instance, this can be accomplished by retrieving a stored stack frame and copying it to the stack or alternatively directing an instruction or stack pointer to a secondary stack including the captured frame. At numeral 730, the next instruction is retrieved and/or executed and the method 700 returns to 720 where the determination is made as to whether a yield or like instruction has been encountered. If no, the method continues at 740 where a determination is made concerning whether the end of the co-routine has been reached. If the end has not been reached then the next instruction can be fetched and/or executed at 730 and the method 700 continues. Alternatively, if a 740 the end of the co-routine has been reached, then at 750 results may be provided to a caller. At reference numeral 760, the co-routine state can be deleted or marked for deletion and the method terminates.

It should be noted that the subject innovation has far-reaching applicability and consequences. More specifically, the subject co-routines can incorporate any control and/or data structure. A stackful co-routine can be referred to as a native monad. A theorem by Andrzej Filinski states that for any monad there is a mapping to and a mapping from the native monad. It is packaged in a pair of functions called reflect and reify. This is significant because a monad is a very general construct. Monads cover relational databases, directed graphs, cyclic graphs or any other data structure. In its simplest terms a monad is a generalization of sets and/or collections. In combination with another theorem that states that the continuation monad suffices for all known control structures (e.g., monitors, semaphores, jumps, trampolines, gotos, co-routines . . . ) it can be shown that by having a native implementation of yield and return every known control structure and data structure can be covered. This means programmers can write simple programs that just look like they are looping over a list, for instance, and yet they can be performing very complex transfers of control and use of state.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 8:
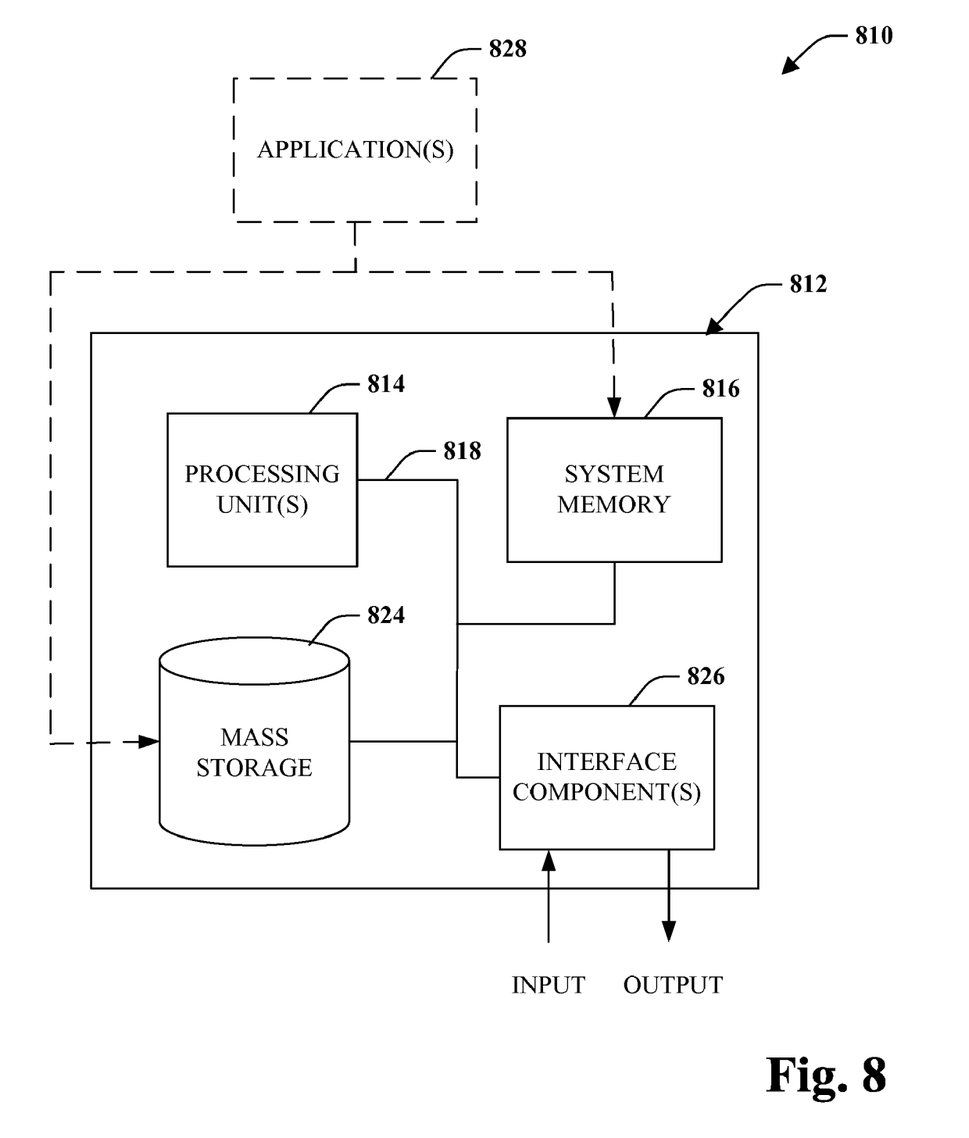
FIG. 8 is a schematic block diagram illustrating a suitable operating environment for aspects of the subject disclosure.
Figure 9:
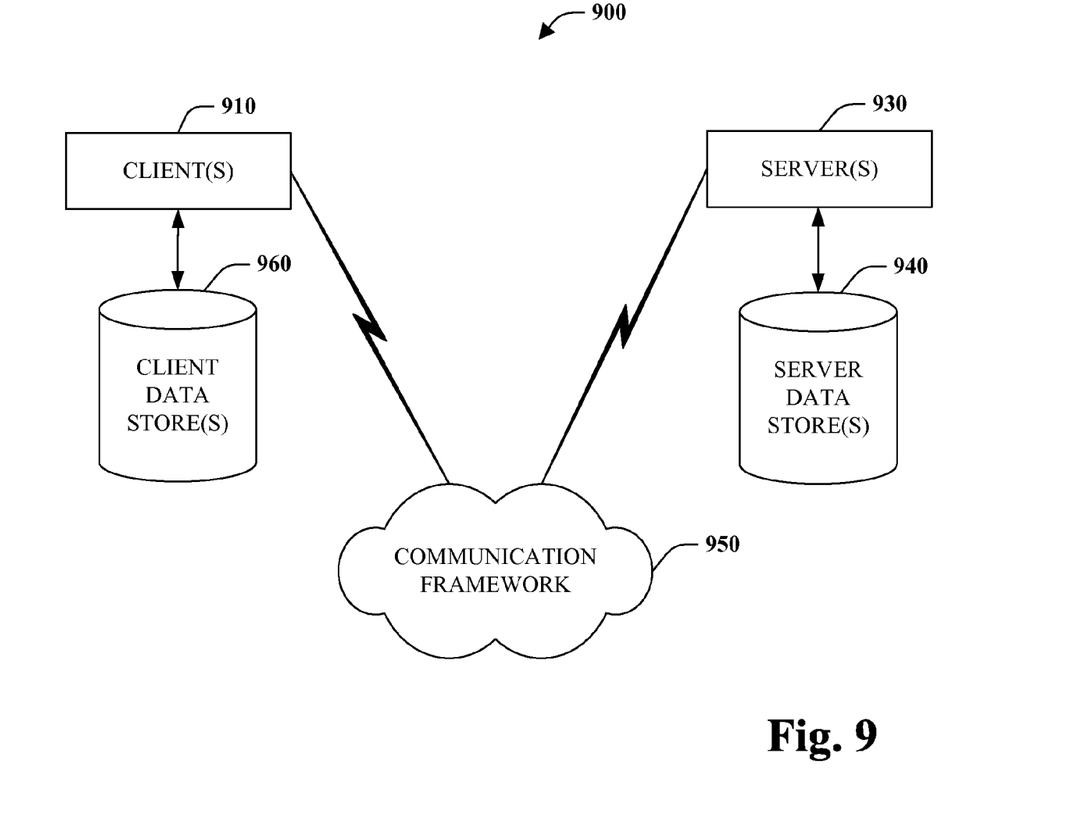
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 8, an exemplary environment 810 for implementing various aspects disclosed herein includes a computer 812 (e.g., desktop, laptop, server, hand held, programmable consumer or industrial electronics . . . ). The computer 812 includes a processing unit 814, a system memory 816 and a system bus 818. The system bus 818 couples system components including, but not limited to, the system memory 816 to the processing unit 814. The processing unit 814 can be any of various available microprocessors. It is to be appreciated that dual microprocessors, multi-core and other multiprocessor architectures can be employed as the processing unit 814.

The system memory 816 includes volatile and nonvolatile memory. The basic input/output system (BIOS), containing the basic routines to transfer information between elements within the computer 812, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 812 also includes removable/non-removable, volatile/nonvolatile computer storage media. FIG. 8 illustrates, for example, mass storage 824. Mass storage 824 includes, but is not limited to, devices like a magnetic or optical disk drive, floppy disk drive, flash memory or memory stick. In addition, mass storage 824 can include storage media separately or in combination with other storage media.

FIG. 8 provides software application(s) 828 that act as an intermediary between users and/or other computers and the basic computer resources described in suitable operating environment 810. Such software application(s) 828 include one or both of system and application software. System software can include an operating system, which can be stored on mass storage 824, that acts to control and allocate resources of the computer system 812. Application software takes advantage of the management of resources by system software through program modules and data stored on either or both of system memory 816 and mass storage 824.

The computer 812 also includes one or more interface components 826 that are communicatively coupled to the bus 818 and facilitate interaction with the computer 812. By way of example, the interface component 826 can be a port (e.g., serial, parallel, PCMCIA, USB, FireWire . . . ) or an interface card (e.g., sound, video, network . . . ) or the like. The interface component 826 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 812 to output device(s) via interface component 826. Output devices can include displays (e.g., CRT, LCD, plasma . . . ), speakers, printers and other computers, among other things.

FIG. 9 is a schematic block diagram of a sample-computing environment 900 with which the subject innovation can interact. The system 900 includes one or more client(s) 910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing the aspects of the subject innovation, for example. One possible communication between a client 910 and a server 930 may be in the form of a data packet transmitted between two or more computer processes.

The system 900 includes a communication framework 950 that can be employed to facilitate communications between the client(s) 910 and the server(s) 930. Here, client(s) 910 can refer to simplified query providers and the server(s) can provide the query processing mechanism. The client(s) 910 are operatively connected to one or more client data store(s) 960 that can be employed to store information local to the client(s) 910. Similarly, the server(s) 930 are operatively connected to one or more server data store(s) 940 that can be employed to store information local to the servers 930.

In one instance, the client(s) 910 can execute a routine that calls or otherwise interacts with a co-routine executed on the server(s) 930. The co-routine can return results and enter into a suspended state wherein the co-routine state or context is persisted to a server data store(s) 940. On a subsequent call by the client(s) 910, the server(s) 940 can restore the co-routine state from data store(s) 940 and continue execution perhaps returning another result and/or terminating. By way of example, this can correspond to a client adding something to a shopping cart wherein a co-routine performs some action and returns such as calculating a total amount due. Each time an item is added or removed from the cart, the total can be updated via the co-routine.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. An application virtual machine system, comprising at least one processor coupled to at least one computer-readable storage medium storing instructions executable by the at least one processor to implement:
   a receiver component configured to receive a computer program; and
   a runtime component configured to execute at least one co-routine specified by the program using operations including
      initiating execution of the at least one co-routine based on a call by a first caller to the at least one co-routine,
      placing the at least one co-routine in a suspended state by capturing a state, including all local and free variables, of the at least one co-routine, by defining a delegate object comprising a single method for maintaining a stack frame as a state of the delegate object, and maintaining the captured state of the at least one co-routine as the state of the delegate object,
      determining that the at least one co-routine has been called by a second caller different from the first caller, and
      based on determining that the at least one co-routine has been called by the second caller, resuming the at least one co-routine from the captured state maintained as the state of the delegate object.

2. The system of claim 1, the operations further including determining whether the at least one co-routine has been called after being placed in the suspended state, and
   based on determining that the co-routine has not been called after being placed in the suspended state, waiting until the at least one co-routine is called after being placed in the suspended state to resume execution.

3. The system of claim 1, further comprising a state component configured to capture the state of the at least one co-routine.

4. The system of claim 3, the state component being configured to save a stack frame associated with the at least one co-routine.

5. The system of claim 4, the stack frame being stored as part of an instance state of an object.

6. The system of claim 4, the stack frame being stored in a co-routine object.

7. The system of claim 3, further comprising a restore component configured to restore the captured state of the at least one co-routine.

8. The system of claim 7, the restore component being further configured to direct execution to an object including the captured state.

9. The system of claim 3, further comprising a return component configured to provision a co-routine result to a caller of the at least one co-routine.

10. The system of claim 1, the at least one co-routine being specified in a context of at least one of a tier splitting pattern, an iterator and/or a query comprehension.

11. A method of program execution, comprising:
    receiving program code that specifies at least one co-routine;
    employing a virtual machine to initiate execution of the at least one co-routine based on a call by a first caller to the at least one-co-routine;
    placing the at least one co-routine in a suspended state by capturing a state, including all local and free variables, of the at least one co-routine, by defining a delegate object comprising a single method for maintaining a stack frame as a state of the delegate object, and maintaining the captured state of the at least one co-routine as the state of the delegate object;
    determining that the at least one co-routine has been called by a second caller different from the first caller; and
    based on determining that the at least one co-routine has been called by the second caller, resuming the at least one co-routine from the captured state maintained as the state of the delegate object.

12. The method of claim 11, further comprising:
    determining whether the at least one co-routine has been called after being placed in the suspended state; and
    based on determining that the co-routine has not been called after being placed in the suspended state, waiting until the at least one co-routine is called after being placed in the suspended state to resume execution.

13. The method of claim 12, further comprising capturing the state as part of an instance state on which the at least one co-routine is defined or capturing the state in a co-routine object.

14. The method of claim 12, further comprising persisting a stack frame associated with the at least one co-routine to a store.

15. The method of claim 12, further comprising restoring the captured state of the at least one co-routine from a stored stack frame, based upon a call from a third caller.

16. The method of claim 15, further comprising directing a stack pointer to a local store including the stored stack frame.

17. The method of claim 15, further comprising returning a result of the at least one co-routine to the third caller.

18. The method of claim 15, further comprising throwing an exception.

19. The method of claim 11, further comprising
    executing the program code on a designated computing platform.

20. A computer-readable storage medium storing instructions executable by a computing device to cause the computing device to perform a method of program execution, comprising:
    receiving program code that specifies at least one co-routine; and
    employing a virtual machine initiate execution of the at least one co-routine based on a call by a first caller to the at least one co-routine;
    placing the at least one co-routine in a suspended state by capturing a state, including all local and free variables, of the at least one co-routine, by defining a delegate object comprising a single method for maintaining a stack frame as a state of the delegate object, and maintaining the captured state of the at least one co-routine as the state of the delegate object;
    determining that the at least one co-routine has been called by a second caller different from the first caller; and
    based on determining that the at least one co-routine has been called by the second caller, resuming the at least one co-routine from the captured state maintained as the state of the delegate object.

* * * * *

UNITED STATES PATENT AND TRADEMARK OFFICE
CERTIFICATE OF CORRECTION

Page 1 of 1

PATENT NO.        : 8,051,426 B2
APPLICATION NO.   : 11/619973
DATED             : November 1, 2011
INVENTOR(S)       : Henricus Johannes Maria Meijer et al.

It is certified that error appears in the above-identified patent and that said Letters Patent is hereby corrected as shown below:

In column 3, line 16, after "support" delete "natively".

Signed and Sealed this
Sixth Day of December, 2011

David J. Kappos
*Director of the United States Patent and Trademark Office*